US011921891B2

(12) United States Patent
Hatcher et al.

(10) Patent No.: US 11,921,891 B2
(45) Date of Patent: Mar. 5, 2024

(54) METHOD FOR RESTRICTING ACCESS TO A DATA OWNER'S DATA

(71) Applicant: PB Analytics Inc., Chandler, AZ (US)

(72) Inventors: Justin Hatcher, Colony, TX (US); David Johnson, Chandler, AZ (US)

( * ) Notice: Subject to any disclaimer, the term of this patent is extended or adjusted under 35 U.S.C. 154(b) by 372 days.

(21) Appl. No.: 17/132,361

(22) Filed: Dec. 23, 2020

(65) Prior Publication Data

US 2022/0198059 A1 Jun. 23, 2022

(51) Int. Cl.
*H04L 29/06* (2006.01)
*G06F 21/62* (2013.01)
*H04L 9/06* (2006.01)
*H04L 9/08* (2006.01)

(52) U.S. Cl.
CPC ........ *G06F 21/6254* (2013.01); *H04L 9/0643* (2013.01); *H04L 9/0816* (2013.01)

(58) Field of Classification Search
CPC .. G06F 21/6254; H04L 9/0643; H04L 9/0816
See application file for complete search history.

(56) References Cited

U.S. PATENT DOCUMENTS

| | | | |
|---|---|---|---|
| 8,458,487 B1 | 6/2013 | Palgon et al. | |
| 10,389,688 B2 * | 8/2019 | Hatcher | G06F 21/6254 |
| 10,757,080 B2 * | 8/2020 | Hatcher | H04L 9/0643 |
| 10,986,073 B2 * | 4/2021 | Hatcher | H04L 63/0428 |
| 11,025,598 B1 * | 6/2021 | Laghaeian | H04L 63/0435 |
| 2006/0034456 A1 | 2/2006 | McGough | |
| 2006/0178997 A1 * | 8/2006 | Schneck | G06Q 99/00 705/50 |
| 2012/0324223 A1 | 12/2012 | Chambers et al. | |
| 2014/0041018 A1 | 2/2014 | Bomar et al. | |
| 2014/0122476 A1 * | 5/2014 | Kaliski, Jr. | G06F 21/6227 707/E17.014 |
| 2015/0312038 A1 * | 10/2015 | Palanisamy | G06Q 20/385 713/155 |
| 2016/0019396 A1 | 1/2016 | Davis et al. | |
| 2017/0060776 A1 * | 3/2017 | Shimonek | H04L 9/083 |
| 2022/0255746 A1 * | 8/2022 | Williamson | H04L 63/0435 |

* cited by examiner

*Primary Examiner* — Shawnchoy Rahman
(74) *Attorney, Agent, or Firm* — Nick Guinn; Gunn, Lee & Cave, P.C.

(57) ABSTRACT

A computer-implemented method of restricting access to a data owner's data comprising the steps of storing a record associated with a data owner; receiving a request to protect data from the data owner; protecting the data by way of encryption, tokenization or other data protection mechanism; returning the data in a protected format to the data owner; receiving a request from the data owner to change the accessibility of the data owner's data; and changing the accessibility of the data owner's data.

9 Claims, 16 Drawing Sheets

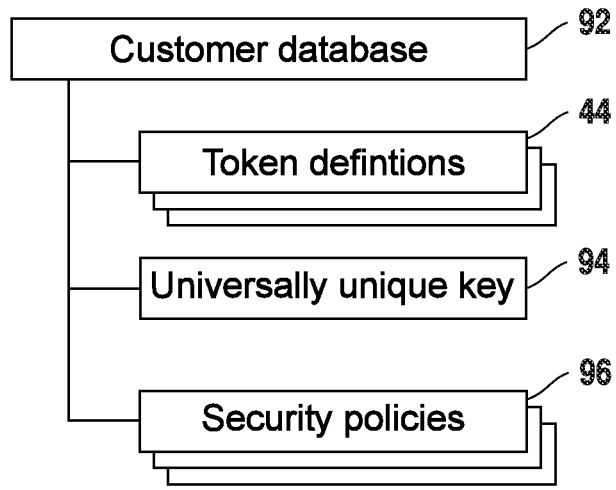

Fig. 6

```
('numeric', '1', '0', '0=2,1=6,2=3,3=9,4=5,5=8,6=4,7=0,8=1,9=7
('numeric', '1', '1', '0=0,1=5,2=1,3=4,4=8,5=9,6=3,7=2,8=6,9=7
('numeric', '1', '2', '0=3,1=5,2=9,3=7,4=8,5=2,6=1,7=4,8=0,9=6
('numeric', '1', '3', '0=9,1=2,2=1,3=4,4=5,5=0,6=7,7=6,8=3,9=8
('numeric', '1', '4', '0=7,1=2,2=0,3=1,4=8,5=3,6=4,7=9,8=5,9=6
('numeric', '1', '5', '0=3,1=7,2=2,3=1,4=4,5=6,6=9,7=8,8=5,9=0
('numeric', '1', '6', '0=1,1=3,2=6,3=8,4=5,5=0,6=7,7=2,8=5,9=9
('numeric', '1', '7', '0=0,1=8,2=7,3=6,4=9,5=5,6=1,7=2,8=4,9=3
('numeric', '1', '8', '0=6,1=3,2=7,3=0,4=4,5=5,6=2,7=8,8=1,9=9
('numeric', '1', '9', '0=2,1=5,2=1,3=0,4=7,5=4,6=8,7=3,8=9,9=9
('numeric', '1', '10', '0=2,1=3,2=4,3=5,4=1,5=7,6=8,7=0,8=9,9=6
('numeric', '1', '11', '0=5,1=0,2=1,3=9,4=8,5=4,6=6,7=7,8=3,9=2
('numeric', '1', '12', '0=8,1=6,2=9,3=0,4=4,5=5,6=1,7=2,8=7,9=3
```

Fig. 7

METHOD FOR RESTRICTING ACCESS TO A DATA OWNER'S DATA

CROSS REFERENCES TO RELATED APPLICATION

Not applicable.

FEDERALLY SPONSORED RESEARCH OR DEVELOPMENT

Not applicable.

BACKGROUND OF THE INVENTION

1. Field of the Invention

The present invention relates generally to restricting access to a data owner's data. More specifically, the invention relates to a system and method of carrying out the right to be forgotten in connection with a data protection mechanism such as encryption, tokenization, etc.

2. Description of the Related Art

Several challenges exist in securing sensitive information (e.g., bank account numbers, credit card numbers, social security numbers, etc.) over the interne. The challenges often manifest themselves when multiple parties exchange or store the information. In a simple scenario, a user/data owner (e.g., a retail consumer) uses a wireless device to purchase a product from a merchant (e.g., a retailer). Often, the data owner opens/creates an online account with the merchant. The data owner frequently turns over sensitive and/or personal identifiable information, among other data. The sensitive and/or personal identifiable information should remain secure on both the data owner and merchant sides so as to prevent a third-party from hacking and stealing the sensitive information. Merchants in this situation have started hiring security providers to store the information themselves and/or take other measures to secure the sensitive information and the transaction carrying the sensitive information. As the merchant participates in more and more sales transactions and accordingly handles more sensitive information or the security provider begins working with more and more customers of its own (i.e., the retailers) the sensitive information becomes cumulative and storage capacity becomes an increasing concern.

These challenges are not new and several systems and methods have been developed to address them. These existing systems and methods, include: encryption with managed key management system; encryption with hosted key management system; managed vaulted tokenization; hosted vaulted tokenization; managed vaultless tokenization; and hosted vaultless tokenization.

All of these options attempt to protect data by moving people away from the data through ciphering it and making it unreadable. The ultimate problem with any data protection scheme is how to ensure the people who have access to the key(s) are not doing something naughty. In fact, by definition, all managed data protection options imply that a single entity or company is holding both the protected data and the means to unprotect it. Hosted Vaulted Tokenization has the same flaw in that an external party owns both the data and the means to decipher it. This is a fundamental flaw because your adversaries are not only people outside your company walls; but people you trust to manage your data. Furthermore, people make mistakes and inadvertently increase data exposure.

This leaves two remaining options: Encryption with Hosted Key Management System and Hosted Vaultless Tokenization. Both successfully separate the ciphered data from the means to decipher it. This leads to the concept of dual control; no single entity can do naughty things. With Vaultless Tokenization, there is no full persistent data that needs to be stored at the hosted site and the consumer/customer will only store non-sensitive tokens. Neither party can read the data without combining the parts that each other has. Furthermore, if a merchant is storing its own customers' (i.e., data owners) data, the tokenization algorithm can include a secret value that only the end user provides, which extends accountability and access control to a third level such that all three entities would need to provide the piece that they know in order for one of the entities to gain access to the protected data.

As described in U.S. Pat. No. 10,389,688, the security provider contemplated therein does not maintain any values that the security provider's customers (i.e., merchants) send to the engine and clear text data is always overwritten in/cleared memory within seconds of an operation. For reference, clear text is the form of a message or data which is in a form that is immediately understandable to a human being without additional processing. In particular, it implies that this message is sent or stored without cryptographic protection.

The invention described in U.S. Pat. No. 10,389,688 is superior to other known data security processes because it: (1) is extremely scalable and cost effective; and (2) eliminates data security issues in regards to the transmission, storage, and processing of sensitive data between two technology systems; and (3) because it can be deployed as a platform in the cloud, it can service multiple tenants/subscribers/customers/merchants/retailers at a time throughout the world; and (4) because the vaultless tokenization solution can be deployed as a platform in the cloud, it actually can eliminate the compliance needs and data regulations around data security that many companies face.

Other challenges exist in the realm of protecting sensitive data. In March 2014, the European Parliament adopted the General Data Protection Regulation (GDPR), which governs how personal data must be collected, processed, and erased. This "right to be forgotten" (RtBF) gives individuals the right to ask organizations (e.g., online merchants) to delete the data owner's personal data. Article 17 of the GDPR states: "The data subject shall have the right to obtain from the controller the erasure of personal data concerning him or her without undue delay and the controller shall have the obligation to erase personal data without undue delay" if one of a number of conditions applies. "Undue delay" is considered to be about a month. The organization must also take reasonable steps to verify the person requesting erasure is actually the data subject.

More recently, the California Consumer Privacy Act (CCPA) was entered into California state law to enhance privacy rights and consumer protection for residents of California. There are several similarities/dissimilarities between the GDPR and the CCPA. Regardless, both laws increase the obligations of businesses when handling consumers' personal information.

Information Technology Security architecture is designed around data loss prevention and the ability to recover. Therefore it is a complex and often unwieldy process to delete all of a data owner's information at their request, as required by GDPR and CCPA. In most organizations, personal identifiable information is stored as encrypted or plain text in the database. No matter if data is encrypted or not, it is accessible by the organization (e.g., merchant), and therefore, personal identifiable information must be removed upon request in order to remain compliant with these laws.

Often, when the data owner wishes for her data to be removed, the data owner contacts customer support at the organization having her personal identifiable information. One issue arises: does the organization's customer support know how to handle this inquiry. At this point, customer support will usually need to open a tick with a database administrator to delete data. Another issue arises: is the database administrator trained in what compliance with GDPR and CCPA (or the like), or company policy entails? The database administrator attempts to delete data by removing data from the database where the database administrator believes the data owner's personal identifiable information is stored. Another issue arises: are all of the locations of personal identifiable information known in all of the databases? And what about the personal identifiable information data stored in other places (e.g., files on employee computers; local backups data warehouse; remote backups; etc.). Backups are especially problematic because they are unchangeable snapshots. In the end, after lots of effort and manual work, how sure can organizations be that all personal identifiable information was removed upon the data owners request?

The present invention solves these challenges. It is frictionless and flexible. The data owner is empowered by the service provider (e.g., online merchant) to control access to her personal identifiable information, allowing the service provider to have access to personal identifiable information data only when it is necessary to complete a transaction. Through this partnership, the risk of inappropriate access or breach of personal identifiable information Data. The invention lowers the cost to the service provider and gives control and peace of mind to the data owner.

In some embodiments of the present invention, there is absolute confidence that personal identifiable information tokens, which the data owner can restrict access to, are unreadable to the service provider and the organization (e.g., merchant). In such embodiments, once the data owner toggles the "Right to be Remembered" button, all of the data owner's personal identifiable information and history are once again available to the service provider. If the data owner wants to be forgotten again, she can toggle the switch to the 'Forgotten' setting, and her personal identifiable information is rendered un-readable once more. All requests and actions are fully auditable.

Some data is not subject to the CCPA or GDPR, such as bulk transactional data. For example an online athletic apparel retailer might obtain personal identifiable information and bulk transactional data from a customer. Personal identifiable information often includes: name, phone numbers, email addresses, physical addresses. By contrast, bulk transactional data might include: gender, age, height, weight, shoe size, product selection. Although a data owner activity might submit/create bulk transactional data—often contemporaneously with personal identifiable information—such data does not identify specific individuals. Rather, the retailer can use the information in bulk for marketing and other business purposes.

BRIEF SUMMARY OF THE INVENTION

The invention is a system and method for securing sensitive information and carrying out the right to be forgotten. The process involves creating a data owner ID and allowing the data owner to decide whether his or her personal information will be readable to a security provider's customer (i.e., tenant) such as a retailer or other organization operating online. The process can be carried out with one of various protection mechanisms (e.g., encryption, tokenization, etc.). In one such embodiment, the process is carried out in connection with a vaultless tokenization engine as described in U.S. Pat. No. 10,389,688.

In such an embodiment, the process works through vaultless tokenization without requiring the merchant, or "service provider" organization to store the original data in a digital "vault" on its premises. When a data owner initiates a transaction with a merchant/service provider, the security provider converts the data owner's personal identifiable information to format-preserving, smart tokens. The security provider transmits these tokens to the service provider, who then stores the tokens (not the actual personal identifiable information) in its database. When needed, the security provider also enables the service provider to de-tokenize a data owner's data in order to complete a payment card or banking transaction, or any other necessary business tasks.

The data owner uses a simple Allow/Not Allow toggle button in the user interface to trigger the tokenization process of their personal identifiable information. If the data owner selects "Not Allow," her personal identifiable information is tokenized and masked from the service provider. While in this form, the tokenized personal identifiable information is not stored in un-tokenized form anywhere on the service provider's infrastructure. If an employee of the service provider attempts to look up the tokenized part of a data owner's record, he will only see tokens. Further, the security provider cannot view nor access the data owner's tokenized personal identifiable information. It is "forgotten." As long as a data owner's unique Identifier is not present, the service provider may not de-tokenize (i.e., may not view) the consumer's "forgotten" personal identifiable information. Thus, once the data owner has performed the RtBF process using his or her unique Identifier, the service provider can no longer see the personal identifiable information. It loses the ability to de-tokenize the data. The entire RtBF process happens automatically and transparently. No employee at the service provider has to do anything to fulfill this RtBF request. The data owner is provided with control of the process by interacting with an online user interface.

BRIEF DESCRIPTION OF THE SEVERAL VIEWS OF THE DRAWINGS

FIG. 6 depicts a customer database object.

FIG. 7 shows an example of a lookup table.

DETAILED DESCRIPTION OF THE INVENTION

Figure 1:
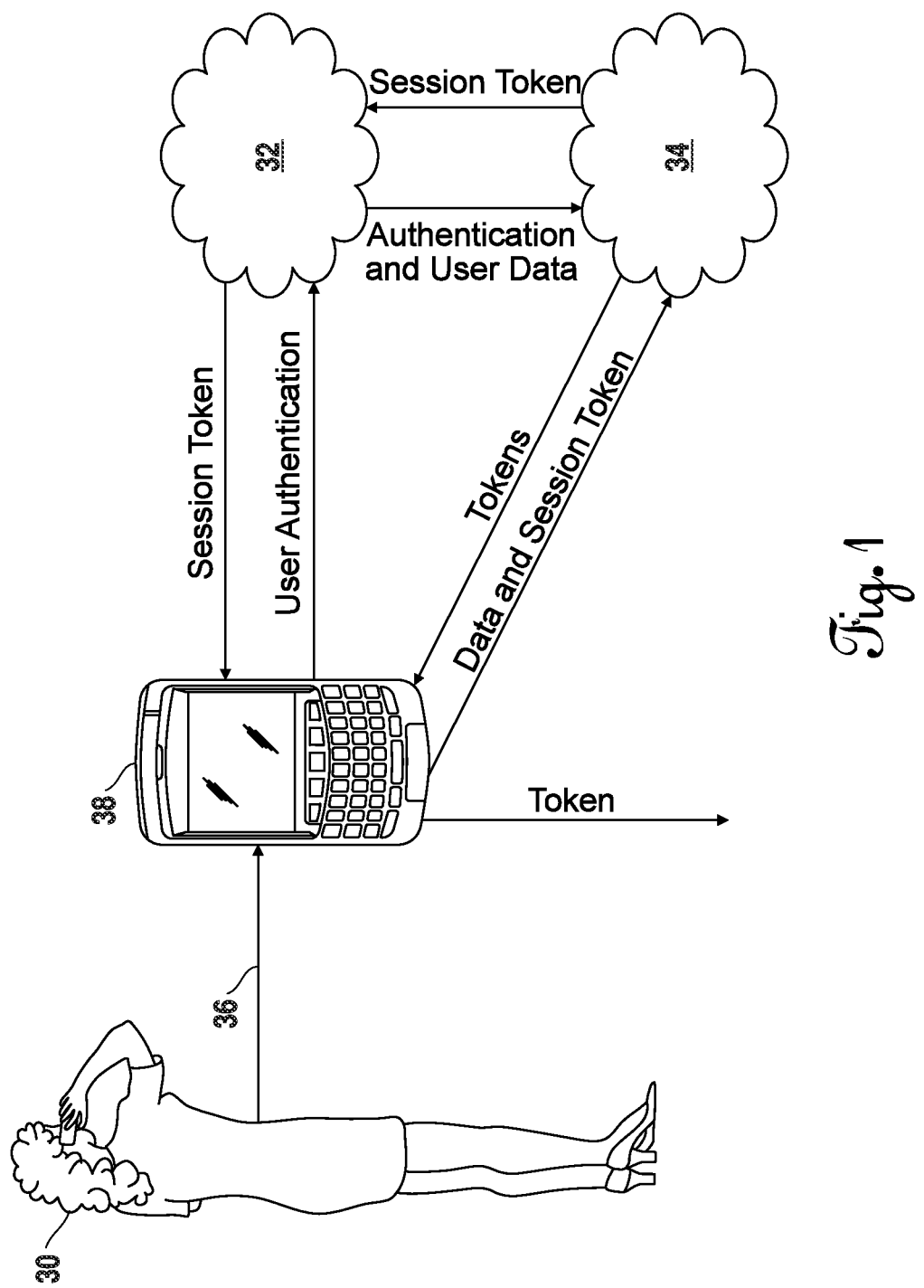
FIG. 1 is a flowchart showing the overall organization and connection of a data owner, a tenant and a security provider to accomplish the vaultless tokenization of sensitive information.

FIG. 1 is a flowchart showing the overall relationship and exchange of information between a user/data owner 30 (e.g., a retail customer), a tenant/customer 32 (e.g., a retail merchant), and a security provider 34 to accomplish the vaultless tokenization of sensitive information (i.e., user data) 36.

From an overview, with different exchanges occurring at different times—discussed in detail below—the user 30 inputs or otherwise provides data to a device 38 such as a smartphone. The device 38 connects to 32 via the internet. To that end, and in this embodiment, the tokenization method described herein is exposed over the internet via HTTP web services. The tenant/customer 32 authenticates the user 30 then requests a session token 40 from the security provider 34 by authenticating with user data 36 and a security policy(s) 96 that authorizes specific actions to the user 30 for a specific time (i.e., expiration date or time). The device 38 provides the security provider 34 with data and the session token over a secure channel using client-side tokenization. The security provider 34 provides the user 30 with a token. At the end, the user data 36 is secured locally at the point of input (e.g., device) 36.

In some embodiments, user data 36 can be stored securely and transmitted once the data is completely substituted and access controlled by policies setup by WV. This occurs because the compromise of protected data requires: compromising data, the customer, and the token engine to decipher—not just an encryption key.

Figure 3:
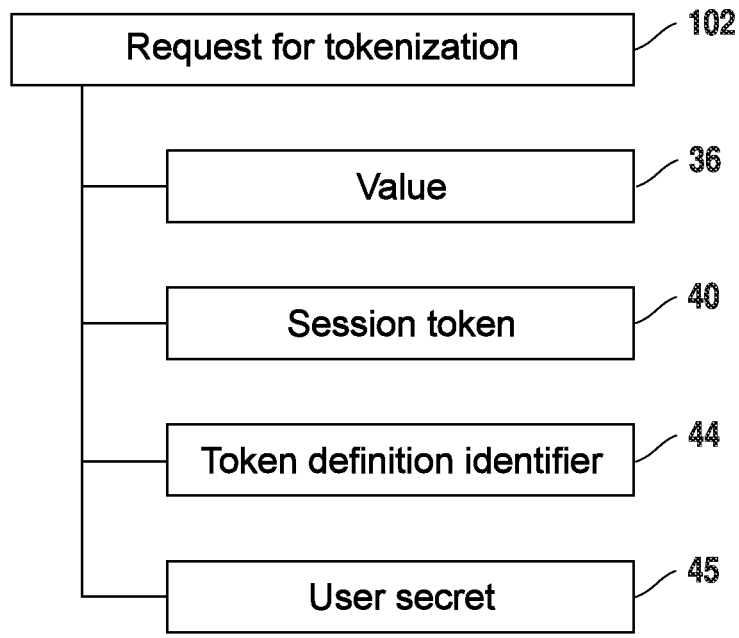
FIG. 3 depicts a request for tokenization.

After the tenant/customer 32 has authenticated the user/data owner 30, in step 102, the tenant/customer 32 makes a request for tokenization. As shown in FIG. 3 a request for tokenization 102 comprises a session token 40, a value 36, a token definition identifier 44, and a user secret 45. A user value 36 is any string of characters provided in a request for tokenization 102 or detokenization (e.g., "John Doe" where the type of sensitive data is a name; "123-45-6789" where the type of sensitive data is a social security number, etc.). A user secret 45 might consist of an answer provided by the user/data owner 30 (and presumably known only by the user) in response to a question (e.g., "what is your favorite book?").

Figure 4:
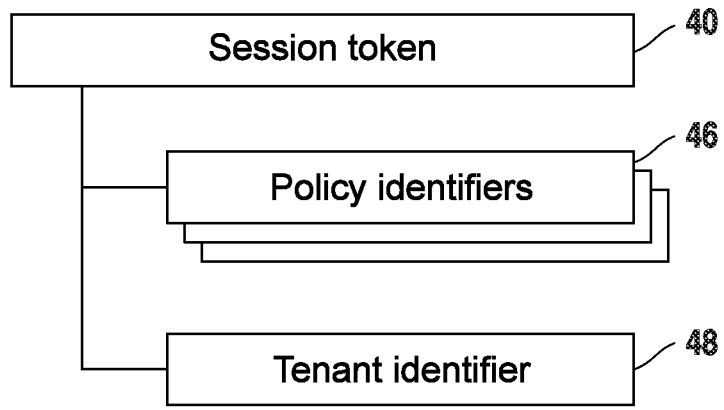
FIG. 4 shows a session token object.

As shown in FIG. 4 a session token 40 comprises one or more policy identifiers 46, and a tenant identifier 48. For convenience, the terms tenant and customer are used interchangeably.

A token definition is a set of configurations that defines how the engine will process values during tokenization or detokenization.

Figure 5:
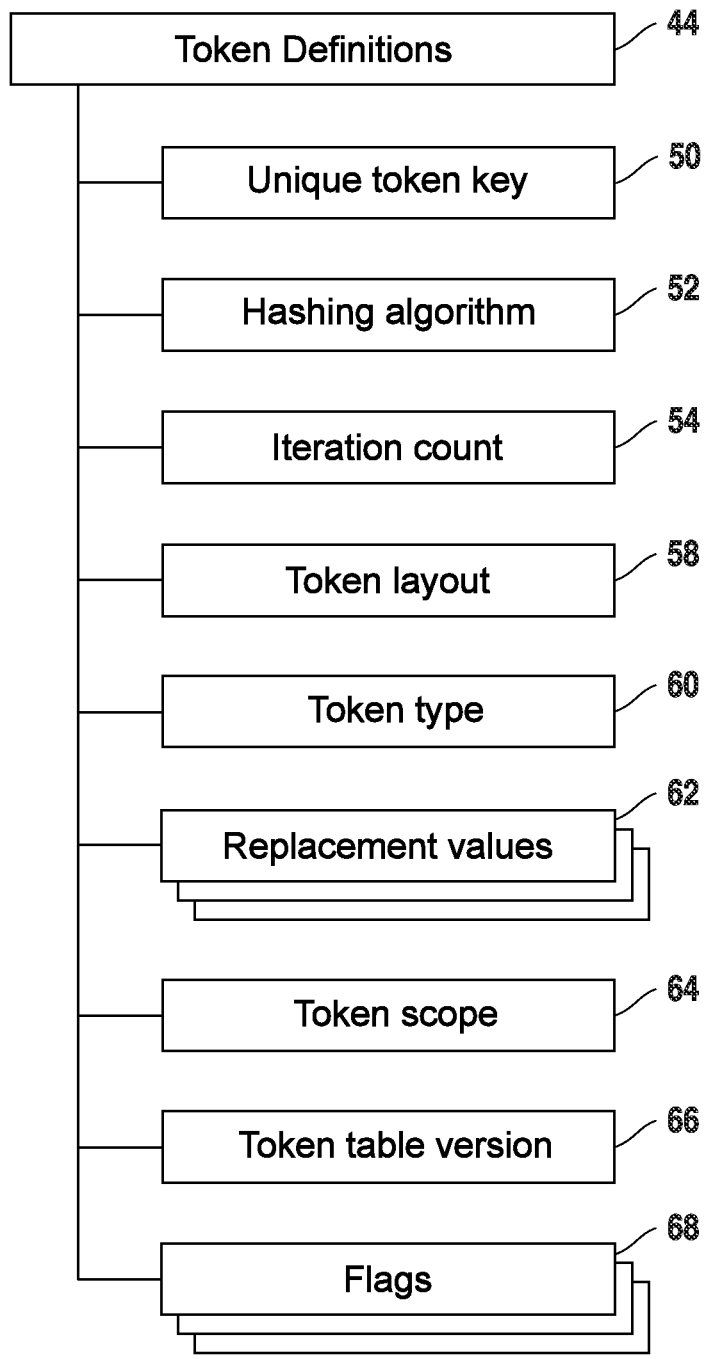
FIG. 5 depicts a token definition object.

As shown in FIG. 5 a token definition 44 comprises a universally unique key 50, a hashing algorithm 52 (i.e., derived key generation mechanism) (e.g., SHA2), an iteration count 54, a token layout 58, a token type 60 (e.g., date, time, string, numeric, etc.), one or more replacement values 62, a token scope 64 (e.g., global, session, random; this attribute controls one of the salt values which can make a token engine run differently depending on time), a token table version 66, and one or more flags 68 controlling how the resulting token should be formatted.

The universally unique key 50 is generated by applying a hash algorithm (e.g., SHA2) to the combination of a value (e.g., user data) 36 and several salt values, wherein one of the salt values is a UUID. A salt is random data used as an additional input to a function that "hashes" a password. Salts are used to defend against various attacks. Salts safeguard passwords during storage. Typically, the salt and the password are concatenated and run through a cryptographic hash function. The resulting output is stored with the salt in a database, rather than the underlying password. Hashing allows for later authentication without keeping and therefore risking the plaintext password in the event that the authentication data store is compromised.

Figure 2:
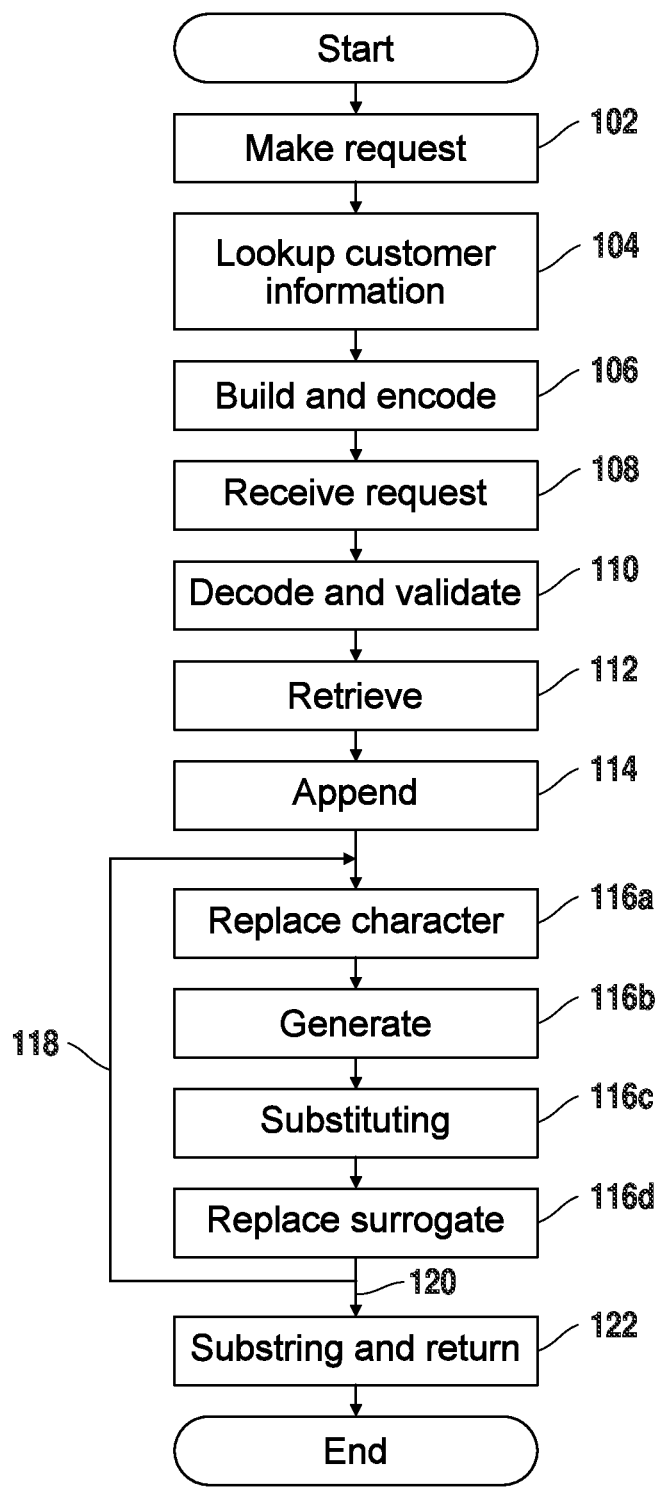
FIG. 2 shows a block diagram of a system embodying the invention of U.S. Pat. No. 10,389,688.

Referring again to FIG. 2, in step 104 the security provider 34 (i.e., the engine) retrieves tenant metadata and the security policy configuration from a customer database 92. In alternative embodiments, the security provider retrieves tenant metadata and the security policy configuration from a cache.

As shown in FIG. 6, the engine reviews a customer database 92 for a universally unique key 94 (with respect to the customer), one or more token definitions 44, and one or more security policies 96. Security policies 96 are defined by the tenant/customer 32. By way of illustration, if a token definition 44 is a set of configurations that defines the data and is used by the tokenization engine, then the security policies 96 define when and who can access the data. Examples of security policies 96, include: allowing only requests from specific IP addresses tokenize data using a particular token definition; allowing only requests from Australia read masked value data using the a particular token definition; allowing only Acme company to tokenize, detokenize their data using any token definition they create; etc.

In some embodiments, a security policy is required before any request is made. Implementing such a limitation allows the security provider 34 to audit and record every user interaction to know when, how and what data is being access by who and if the user was successful.

Referring back to FIG. 2, in step 106 the engine 34 builds and encodes a session token 40 using all policy identifiers 46 and tenant unique keys 48. Accordingly, the session token 40 internally references its security policy and tenant. In this embodiment, the session token 40 expires in a configured period of time as the customer has set when creating the security policy definition. By example, a session token 40 might take the following form: 1X4acoMYSxblvLju9mar4FY+A051Tuuu+fQetxrAziVn-8q214DdG2qQ5MJMsjpgtwTV 8NoIuMTkwLjc3LjE1Mn-wwfDF8MXwwfDJqbWo3bDVyU3cwCQZim1+s7E58t0p-Pmt fOPzHtJD7yJ4/a/wmdN5u2Mh0MW7xnFv/vU".

Referring again to FIG. 2, in step 110, the security provider 34 decodes and validates the session token. That is, the session token is authorized against the policy definition. Validating and deconstructing a session token 40 involves running the tokenization process in reverse to resolve a session token back to session data. Decoding is the reverse process of creating a session token. It involves detokenizing the session token, then decoding from base 64 (or other decoding scheme), which will result in the session token details as a string of attributes such as policyid, tenantid, timestamp. The validation step occurs when the security provider confirms that the session token is not expired, and that the security policy that is contained in the session token is authorized to perform a requested API action on a specific token definition. By example, an API action might include tokenize, detokenize, getmasked, encrypt.

In step 112, the security provider retrieves the token definitions 44, a token key 50 logically related to the token definition 44, and a security policy 46 related to the user/data owner 30 from the database logically relating the token definition 44, the token key 50, and the security policy 46 to the user/data owner 30.

In step 114, the security provider 34 appends the user value 36 and the tenant unique key 48 (i.e., tenant definition key), to the token unique key 44 (i.e., token definition key) and the user secret 45. The resulting, new value is the input value 97. If the token scope 64 is "global," the input value is created by appending the value, a static salt value, a unique token key and a client secret. If the token scope 64 is "session," the new value is created by appending the value, a static salt value, a session seed (which is a UUID) and a client secret. If the token scope 64 is "random," the new value is created by appending the value, a static salt value, a UUID and a client secret.

In step 116a-116d the security provider traverses each character in the input value 97 according to format configurations provided by the tenant/customer 32 on the token definition 44. In step 116a a single character at the index is substituted with a common static character that will be the same for every operation of the given token definition configurations—as described above. The replacement of a character with a static "known" character before performing the one-way hash to obtain the derived key is important because it allows deconstruction and makes detokenization possible by reversing the process.

In step 116b, and once the single character at the index is substituted with the common static character—based on the token definition configurations—a salt value is appended to the common static character. After the salt value is appended to the common static character, a one-way secure hash is performed. In this embodiment, the security provider uses a SHA2 hash. However, any hash algorithm or encryption mechanism could work.

The result of the hash algorithm on the combination of the common static character and the salt value is called a derived key 98.

In alternative embodiments, the derived key might be a function of the original value of the single character at the index. Because hash algorithms are by definition one-way, the derived keys would not be reproducible unless this process was used.

In step 116c, one or more replacement tables (i.e., lookup tables) are selected from a pool of tables. In this embodiment, the decision for selecting the one or more replacement tables is based on the input value 97, the index, the value of the single character (i.e., character value) at the index, and the derived key 98. If two or more replacement tables are selected their order should be randomized from the perspective of a user/data owner because the user/data owner will not know the derived key at the time of the underlying request. However, the replacement tables will iterated in a deterministic order because the derived key is used to select and arrange the replacement tables in a particular order.

Then, iterating through the series of two or more replacement tables, the engine 34 looks up a surrogate replacement value in translating the character value through each of the replacement tables. That is, the process will traverse each of the two or more replacement tables for translation.

FIG. 7 is an example of a numeric, replacement table. Reading this table from left to right, the first column reflects the type of characters mapped between. In this table the type is "numeric," to be used for values ranging from zero to nine. Alternative types might include upper case letters, lower case letters, alphanumeric, symbols, etc. The next column designates the version of the table. The third column speaks to the index of the character to be replaced. Because a string of data could include more than thirteen digits/indexes, a table could be larger. Both version and index increment and represent different permutations and random sets of key/value mappings. The last column reflects the key/value mappings.

In this preferred embodiment of the invention, replacement tables do not grow with the number of tokens. Also in this preferred embodiment, a pool of hundreds of thousands of replacement tables are used, which map small pieces of values such as a single character to a surrogate character (e.g., in table 1, 1=2, in table 2, 1=3, so on and so on). rather than the full value. Alternatively, tables may contain more than a single character. So a table value pair could also be "AB2"="XD6".

By incorporating a large selection of replacement tables, the security provider is afforded greater flexibility, greater randomization and accordingly greater protection to the tenant/customer and user/data owner. In a preferred embodiment, each table is tagged with a descriptor value that can tell the engine the types of values the table contains. During a tokenization request, judging by the source data being requested for tokenization/detokenization, a smaller pool of replacement tables can be selected based on data elements contained. From there, the security provider can generate a unique value using the data that was provided in addition to several salt values, which are secure static values in preferred embodiments. However, in alternative embodiments a customer may configure the values to be contextual or completely random. To generate the derived key—as described above—a cryptographically secure algorithm is used, such as SHA2.

There are a variety of different replacement tables available that enable the security provider to use the replacement tables to perform tokenization on other data like dates, times, numeric, alphanumeric, and other languages.

In some embodiments, the replacement table values can equal themselves. Alternatively, the values might never equal the same value based. This characterization of replacement tables is based on a customer configuration of the tokenization engine. In preferred embodiments the replacement tables are highly optimized for speed and take into count several indexes that allow for more complexity during the tokenization process.

Referring again to FIG. 2, in step 116d, the resulting character is substituted into the character value at the current index. By example, assume the character at the index in the derived key 98 is "1." If "1" becomes "2" in table 1, then the resulting value is processed through table 2 where the value "2" becomes "4", and finally the resulting value is processed through table 3 where the value "4" to "5." If "5" is the result of the final table, then the number "5" is inserted back into the original value at the same index.

In step 118, the next character in the input value sequence is then run through the steps 116a-116d until all characters have been substituted through steps 116a-116d. Because the value changes during each replacement and because the changing value is a component of creating the derived key 98, it is becomes extremely difficult to predict or determine the randomness of the replacement values that ultimately result from the tokenization process.

Once all characters in the input value have been substituted through steps 116a-116d, the process no longer repeats steps 116a-116d, the engine strips off the salts previously added, in step 122. The resulting value (i.e., string of characters) is the final token value 99. The final token value 99 is then secured locally at the point of input 38, with the user/data owner 30. Because of this process, the security provider 34 is not required to store the secured data on its own servers or other media.

The process of deconstructing a token involves running this process in reverse, and processing the replacement of values in reverse order than was used to generate the token. The security provider 34 retrieves the final token 99, session token, and token definition identifier from the user/data owner 30 at the point of input 38. The security provider 34 returns the final token 99 to its form containing the salts previously added, in step 122. The security provider begins identifying a surrogate value at a particular index. First, the character(s) are replaced with static value(s) defined in the token definition. Then the derived key is generated (the derived key is used to select and order the lookup tables that will be used for the translation. Second, security provider then proceeds to reverse translate (i.e., replacing one value with a different value) the surrogate value identified in in the previous step using the one or more lookup tables provided for based on the token definition, input value, index, character value and the derived key. Third, the process continues by processing the derived key in reverse through the algorithm (tokenization engine 118). The resulting value is the input value. Fourth, the process continues by requiring the security provider to replace the character at the index with the original character at that index based on the token definition configurations. The prior four steps are repeated until all substituted characters have been replaced with their original values in the input value.

The security provider then trims input value 97 such that the user value 36, the tenant unique key 48, the token unique key 44 and the user secret 45 are no longer appended. The security provider returns the user value to the user/data owner.

One of ordinary skill in the art will appreciate a variety of embodiments that capture the spirit of the present invention. For instance, other information may be included when creating input value. Such information might include information regarding the API, an expiration date or time, source Internet Protocol (IP) information, information for debugging/flagging, security policy identification, identifying information regarding one or more keys, security flags, proxy identification, etc.

Figure 8:
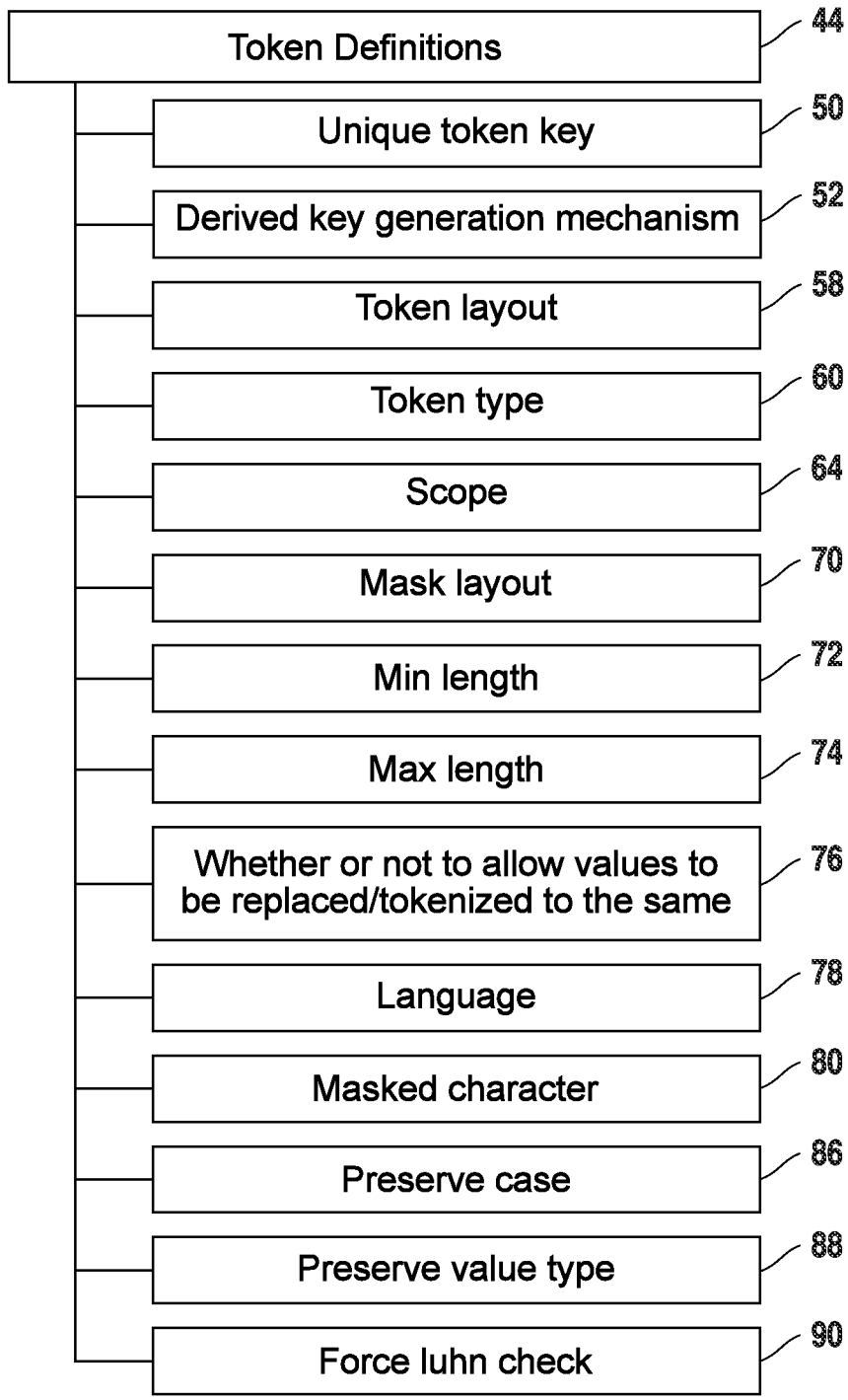
FIG. 8 depicts a token definition object of an alternative embodiment.

FIG. 8 illustrates a token definition of an embodiment alternative to the token definition illustrated in FIG. 5. The token definition of FIG. 8 comprises a unique token 50, a token layout 58, a mask layout 70, a minimum token length 72, a maximum token length 74, whether or not to allow values to be replaced/tokenized to the same value 76, a token type 60 (e.g., date, time, string, numeric, etc.), a language 78 (e.g., English, Spanish, etc.), a masked character 80 (e.g., *), a hashing algorithm 52 (i.e., derived key generation mechanism) (e.g., SHA2), a preserve case 86 (e.g., true, false), a preserve value type 88 (e.g., true, false), a force luhn check 90, and a token scope 64. The term force luhn check is used to describe the widely used algorithm (i.e., the Luhn algorithm, the Luhn formula, the "modulus 10" or "mod 10" algorithm), which is used for checking multi-digit numbers to indicate whether, in transmitting a number, an error has been made, such as a transposition of the digits.

Figure 9:
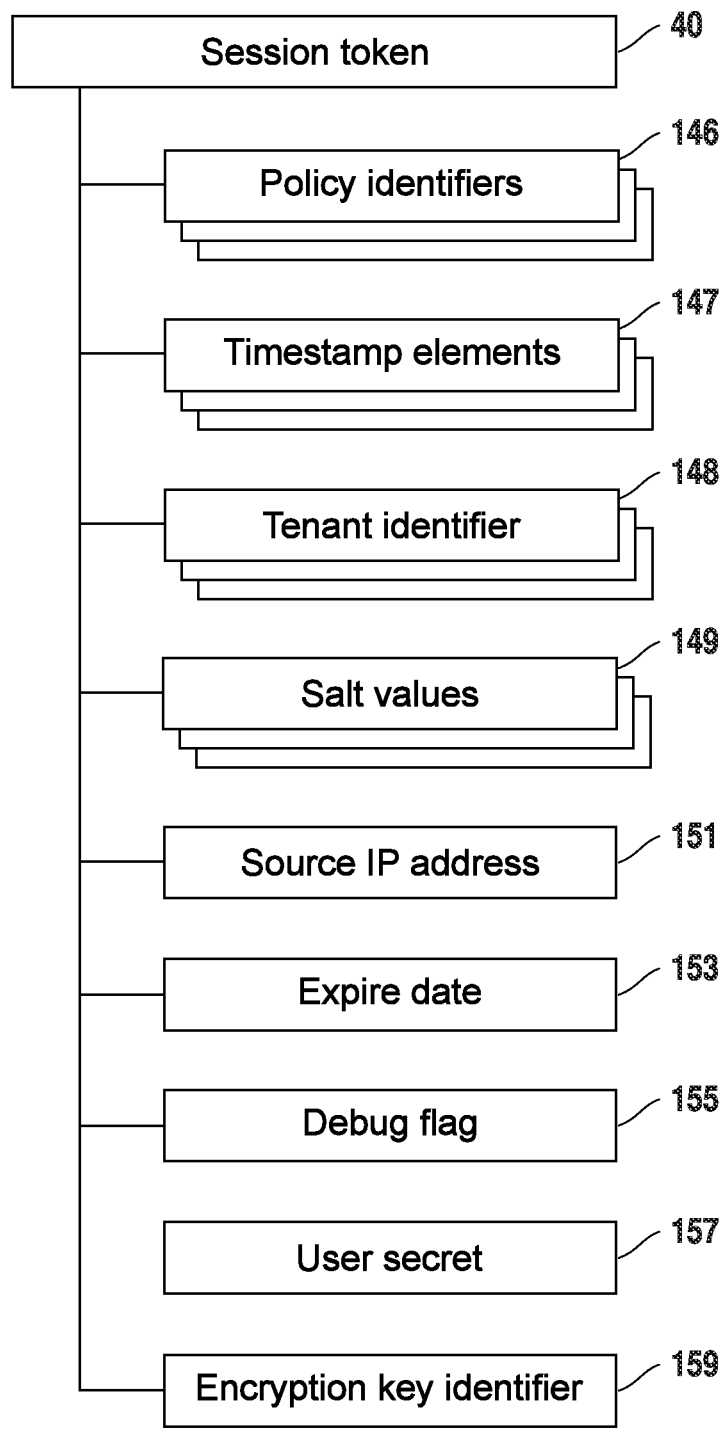
FIG. 9 depicts a session token object of an alternative embodiment of the invention of U.S. Pat. No. 10,389,688.

FIG. 9 illustrates a session token 140 of an embodiment alternative to the session token 40 illustrated in FIG. 4. The session token 140 of FIG. 9 comprises one or more policy identifiers 146, one or more timestamp elements 147, one or more tenant identifiers 148, one or more salt values 149 that can be used to further customize the tokenization engine, a source IP address 151, an expiration date 153, a debug flag 155, a user secret 157, and an encryption key identifier 159. The user configurable timestamp 147 is used to secure access by a time limit. The salt values would be included in the function to assist generate the derived key. A user secret is such a salt value that can be entered when requesting tokenization and this value can be included in the session token.

Figure 10:
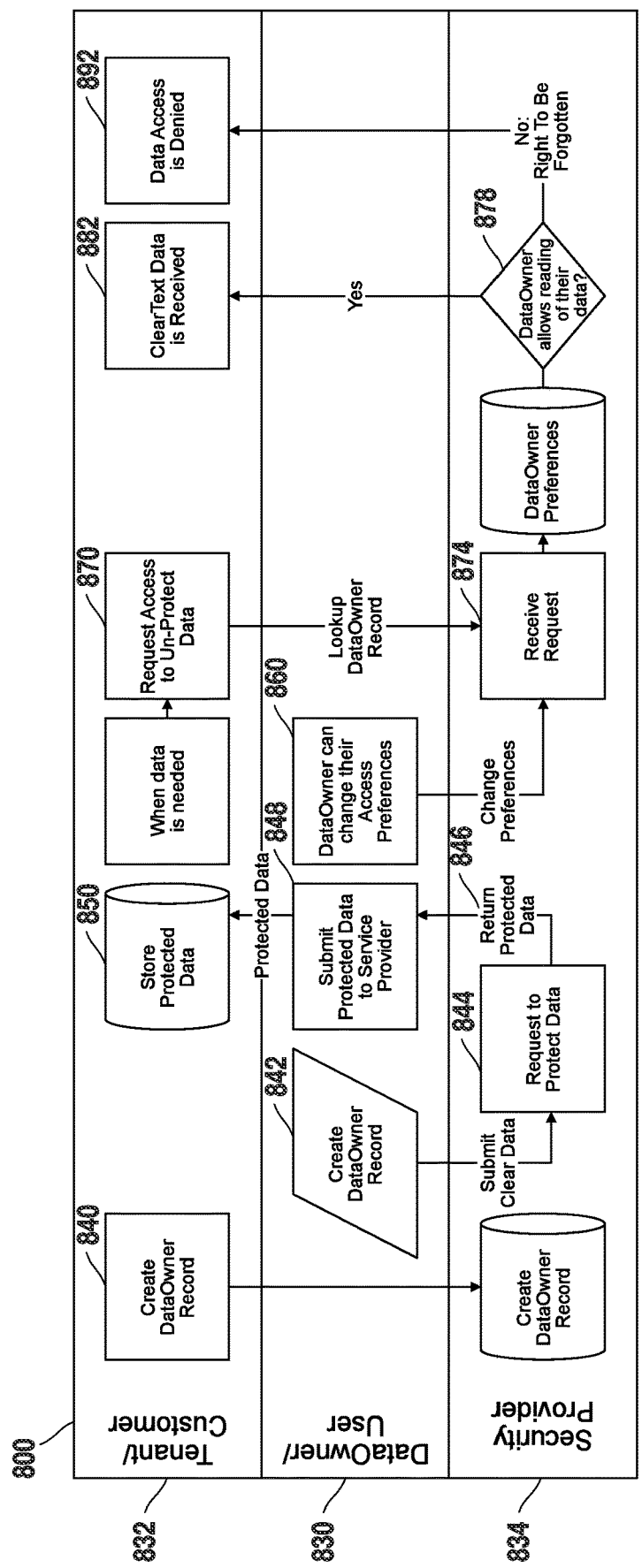
FIG. 10 is a block diagram in an embodiment of the present invention of carrying out the right to be forgotten process with a protection mechanism.

FIG. 10 is a block diagram illustrating an embodiment of the present invention, namely, carrying out the right to be forgotten process with a data protection mechanism. In this embodiment, there are four stages for carrying out the right to be forgotten: creating a data owner record; inputting data; changing access preferences; and requesting data previously input (and either granting or denying the request). In alternative embodiments, these stages might be performed in a different sequence. For example, the data owner might change her access preference at the time the data owner record is created (rather than waiting until data has been input). Alternatively, a tenant/customer might request and receive data (or be denied data) before the data owner requests a change in her access preference.

As shown in FIG. 10, step 840 involves the tenant/customer 832 creating a data owner record, which prompts the security provider 834 to store a data owner record. When the tenant/customer requests a data owner record be created, the security provider creates and stores this new record with a unique identifier known internally as the data owner ID into a database managed by the security provider. It is contemplated that step 840 will frequently arise when a data owner 830 (e.g., online shopper) creates an online account or makes a purchase with a tenant/customer 832 (e.g., online retailer). In this embodiment, once step 840 is performed, the stage of inputting data can occur.

In this embodiment, inputting data arises by way of the data owner 830 entering data (e.g., by way of an online form) in step 842. The data is then submitted to the security provider 834 and triggers a request to protect the data in step 844—which the security provider performs. The data can be protected by way of one of several protection mechanisms (e.g., encryption, tokenization, etc.).

In step 846 the protected data is returned to the data owner 830, who submits the protected data to the tenant/customer 832 in step 848. In step 850 the tenant/customer 832 stores the protected data. In this embodiment, the storage of protected data generally concludes the stage of inputting data.

The next stage illustrated in FIG. 10 involves changing access preferences. This stage can be characterized by the data owner 830 changing her access preferences in step 860. For example, the tenant/customer 832's user interface—often where the data owner created her account with the tenant/customer—may include a button/toggle for the data owner to change her access preferences. The data owner might be required to login or otherwise authenticate with the tenant/customer. The login/interface provides an option for the data owner 830 to limit or restrict access to her data (i.e., to be forgotten).

In one such specific embodiment, a prompt reads: "Data Access Control" followed by a button that toggles between "Allow" and "Forgotten." If the data owner elects to allow data access control, the tenant/customer 832 and the security provider 834 will have the ability to access and read certain personal information belonging to the data owner 830. Alternatively, if the data owner elects to be forgotten or restrict/limit, the tenant/customer 832 and the security provider 834 will be denied access and cannot read the protected data. The security provider receives the data owner's request and changes the data owner's preferences, accordingly.

The next stage shown in FIG. 10 is requesting data previously input. When the tenant/customer 832 needs/wants to access a data owner's data, the tenant/customer requests access to the protected data in unprotected format (e.g., clear text) in step 870. This request prompts a lookup of the data owner record step (the data owner record created in step 840).

The security provider 834 receives the tenant/customer's request for access to unprotect the protected data in step 874. The security provider 834 checks the data owner's access preferences to see if the data owner allows reading of her data in step 878. If the security provider determines that the data owner allows reading of her data, unprotected, the security provider converts the protected data to unprotected data (e.g., decrypts, detokenizes) and the tenant/customer 832 receives clear text data in step 882. If the security provider determines that the data owner does not allow reading of her data, the tenant/customer 832 is denied access in step 892. In some embodiments, the tenant/customer 832 is prompted "Access Denied by Owner" or the like.

Figure 11:
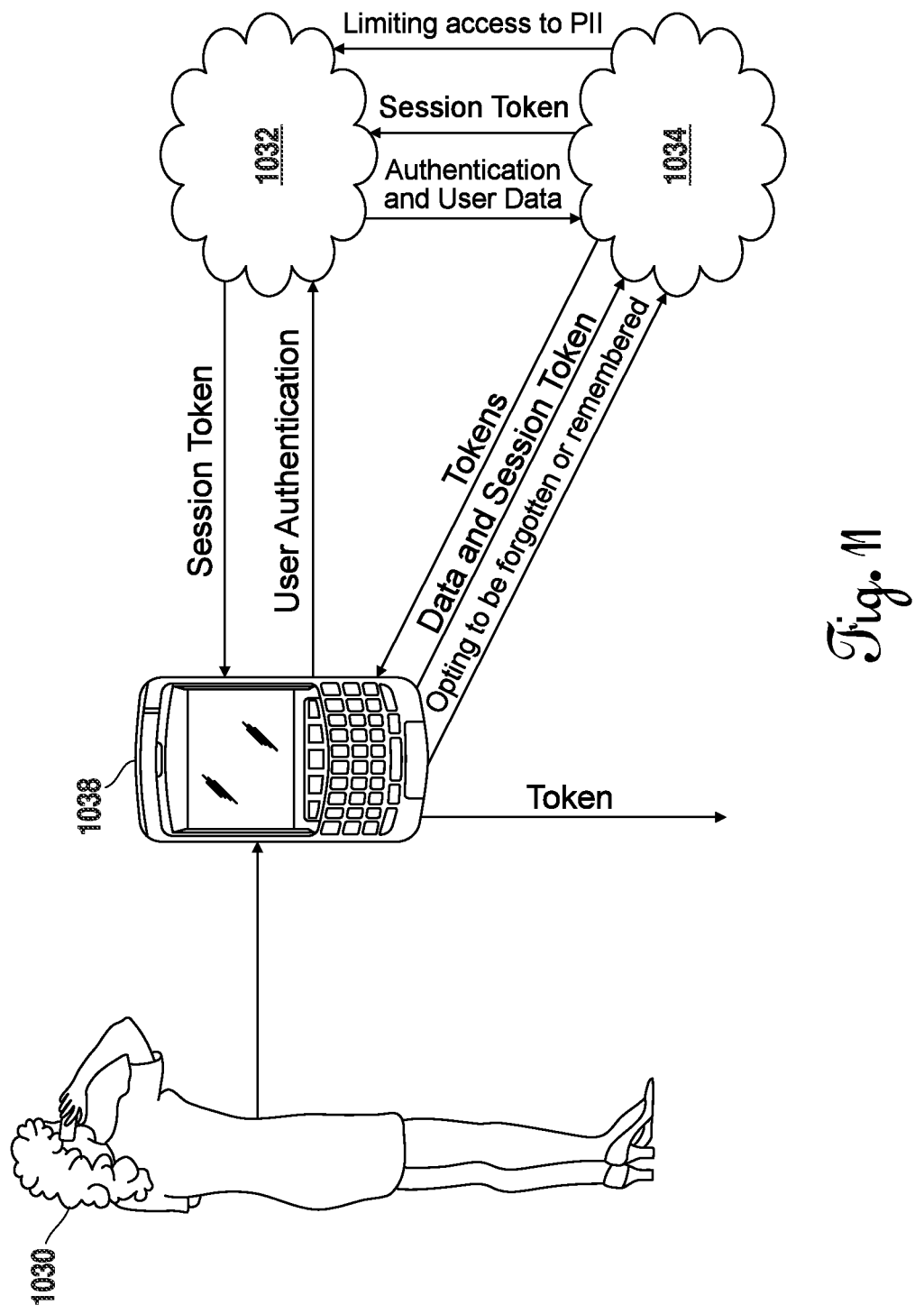
FIG. 11 is a flowchart showing the overall organization and connection of a data owner, a tenant and a security provider to carrying out the right to be forgotten using vaultless tokenization.

FIG. 11 is an illustration showing the overall organization and connection of user (i.e., data owner), tenant/customer (i.e., service provider) and security provider in an embodiment of carrying out the right to be forgotten process by way of vaultless tokenization.

From an overview, and like the embodiment described above with respect to FIG. 1, with different exchanges occurring at different times—a data owner 1030 inputs or otherwise provides personal data to a device 1038 such as a smartphone. The device 1038 connects to a tenant/customer 1032 via the internet. To that end, and in this embodiment, the tokenization method described herein is exposed over the internet via HTTP web services. The tenant/customer 1032 authenticates the data owner 1030 then requests a session token 1040 from the security provider 1034 by authenticating with data owner's data 1036 and a security policy(s) 1096 that authorizes specific actions to the data owner 1030 for a specific time (i.e., expiration date or time). The device 1038 provides the security provider 1034 with data and the session token 1040 over a secure channel using client-side tokenization. The security provider 1034 provides the data owner 1030 with a token. At the end, the data owner's data 1036 is secured locally at the point of input (e.g., device) 1038.

In this embodiment—where the data owner 1030 will have the option to make her personal data readable or not readable—a data owner ID will be created. Subsequently, the data owner 1030 can request to make her data readable or not readable. The security provider 1034 receives the request to make the data owner's data 1036 readable and thereby limits access to the data owner's data 1036 by both the tenant/customer 1032 and the security provider 1034.

Figure 12:
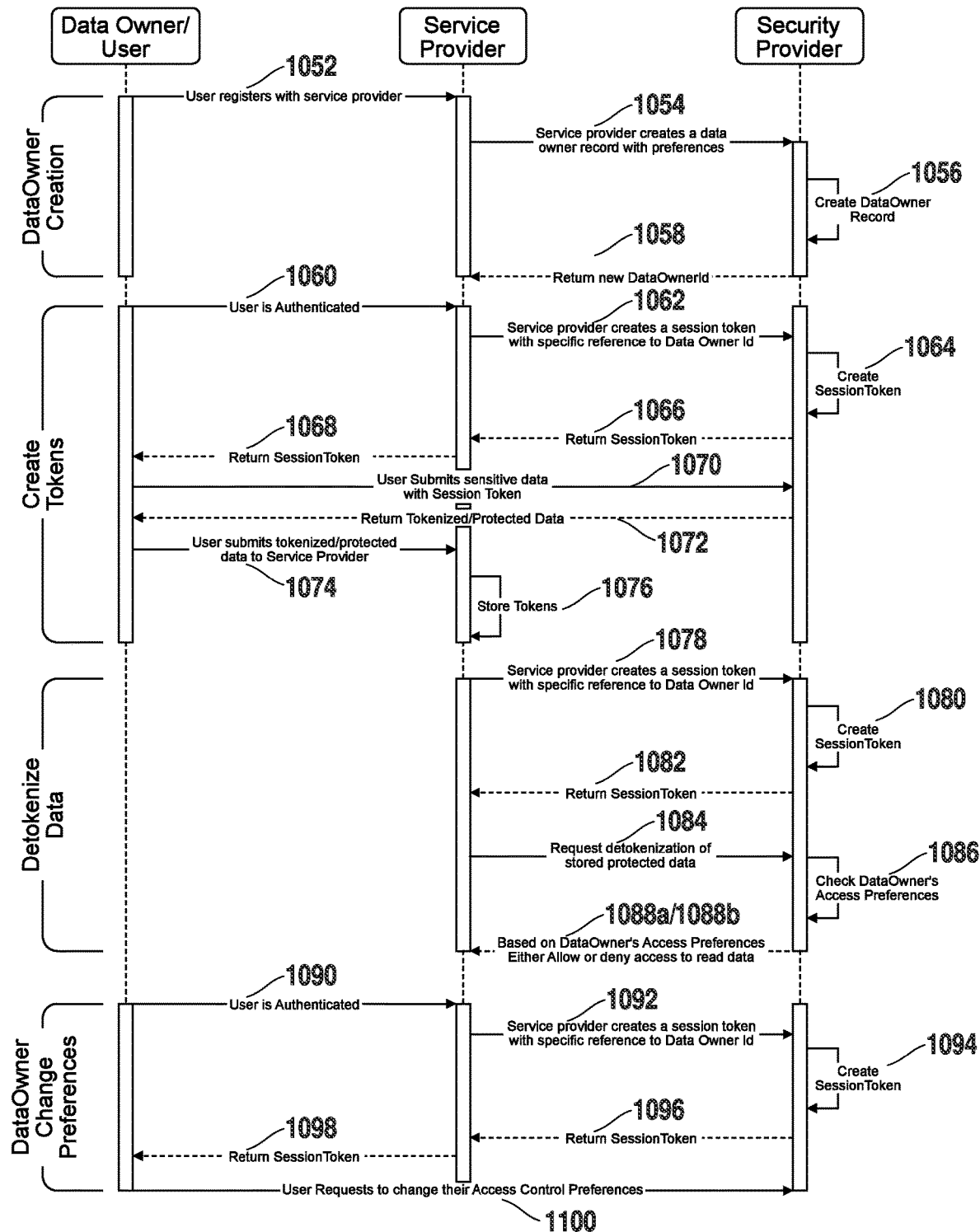
FIG. 12 is a block diagram in an embodiment of the present invention using vaultless tokenization.

FIG. 12 is a block diagram in an embodiment of carrying out the right to be forgotten process with vaultless tokenization. Like the embodiment illustrated and discussed in FIG. 10, this embodiment involves the right to be forgotten process carried out with a data protection mechanism. In this embodiment, there are four broad stages for carrying out the right to be forgotten: creating a data owner record; creating tokens with input data; detokenizing requested data; and changing access preferences. In alternative embodiments, these stages might be performed in a different sequence. For example, the data owner might change her access preference at the time the data owner record is created (rather than waiting until data has been input).

As shown in FIG. 12, step 1052 involves the data owner 1030 registering (i.e., creating) an account with the tenant/customer 1032, which prompts the tenant/customer 1032 requesting the security provider 1034 to create a data owner record with preferences in step 1054. The security provider 1034 then creates a data owner record in step 1056. After the data owner record is created, the security provider 1034 returns a data owner ID to the tenant/customer 1032. A data owner ID references the data owner record, and is an attribute of a data owner database discussed below. The data owner database is stored by the security provider. In this embodiment, once a data owner record is created, the stage of creating tokens with inputted data can occur.

In this embodiment, creating tokens with inputted data follows a familiar method of vaultless tokenization described in U.S. Pat. No. 10,389,688. In this embodiment, the method may be initiated by way of the data owner 1030 authenticating her credentials (e.g., completing an online account or logging into an account with a password or the like) in step 1060. The tenant/customer 1032 then requests the security provider 1034 to create a session token with specific reference to the data owner ID in step 1062. The security provider 1062 creates a session token in step 1064, and returns the session token to the tenant/customer in step 1066. The tenant/customer forwards the session token onto the data owner 1030 in step 1068.

After the data owner 1030 receives the session token, the data owner 1030 can input and submit personal identifiable information (i.e., data) along with the session token back to the security provider in step 1070. The term personal identifiable information is somewhat subjective and might include—among other things—names, contact information, SSN, but generally refers to information subject to protection and the right to be forgotten herein. When the security provider 1034 receives the data owner's data 1036 from the data owner—along with the session token—the security provider tokenizes the data and returns the tokenized (i.e., protected) data to the data owner in step 1072. In at least one embodiment, tokenization is carried out using vaultless tokenization as described earlier herein. The data owner 1030 submits the tokenized data to the tenant/customer 1032 in step 1074. The tenant/customer 1032 stores the tokens in step 1076.

The next stage shown in FIG. 12 involves the tenant/customer 1032 requesting access to the data owner's data that has been tokenized. When the tenant/customer 1032 needs a data owner's data, the tenant/customer requests a session token with specific reference to the data owner ID in step 1078. The security provider 1034 receives the request for session token and creates a session token in step 1080. The security provider returns the newly created session token to the tenant/customer in step 1082. At that point, the tenant/customer requests detokenization of previously tokenized data—the tokenized data belonging to the data owner—in step 1084. The security provider receives the request to detokenize and checks the data owner's access preferences in step 1086. That is, the security provider 1034 checks the data owner's access preferences to see if the data owner allows reading of her data. If the security provider determines that the data owner allows reading of her data, unprotected, the tenant/customer 1032 receives clear text data in step 1088*a* (which include detokenization of the tokenized data). If the security provider determines that the data owner does not allow reading of her data (i.e., the data owner has elected to "be forgotten"), the tenant/customer 1032 is denied access in step 1088*b*.

The final stage illustrated in FIG. 12 involves the data owner 1030 changing her access preferences. As discussed above, this stage need not occur last chronologically. This stage can be characterized by the data owner 1030 authenticating her credentials (i.e., logging in) in step 1090. In this embodiment, after the data owner is authenticated, the tenant/customer 1030 requests a session token—with specific reference to the data owner ID—from the security provider 1034 in step 1092. The security provider then creates a session token in step 1094, and returns the session token to the tenant/customer in step 1096. The tenant/customer forwards the session token onto the data owner 1030 in step 1098. With the session token, the data owner can change her access preferences in step 1100.

In at least one embodiment, some prerequisite actions include: the right to be forgotten (or other access preference modifying) feature having been enabled on the tenant/customer account; the tenant/customer configuring token definitions describing data the tenant/customer will allow the data owner to control, and the tenant/customer creating a data owner record via the security provider's API.

Figure 13:
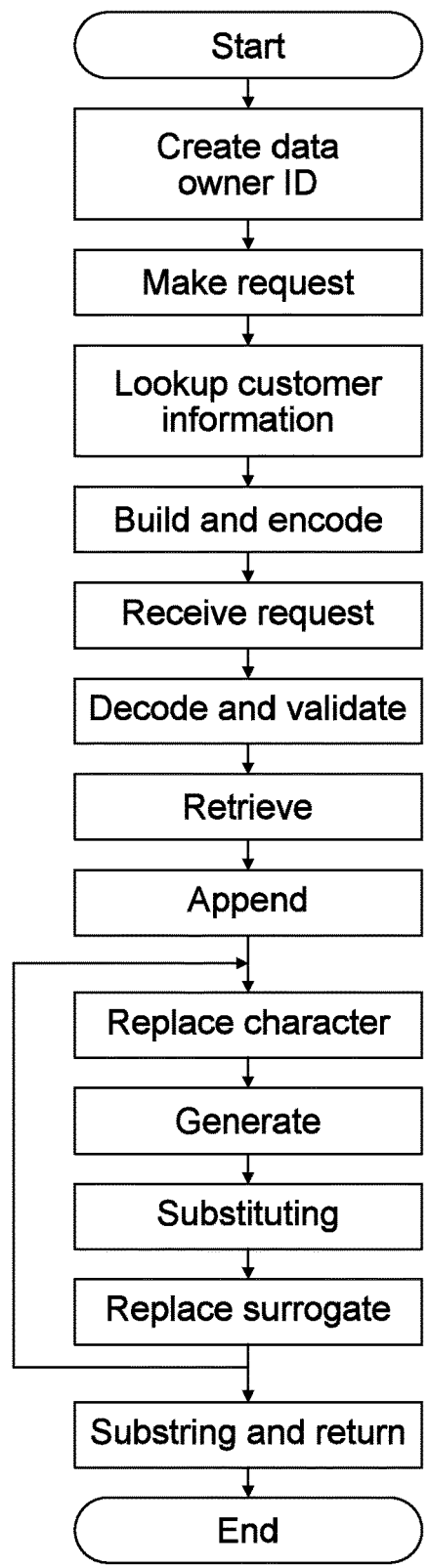
FIG. 13 is a block diagram showing the steps of tokenization in the embodiment illustrated in FIG. 12.

FIG. 13 is a block diagram showing the steps of tokenization in the embodiment illustrated in FIG. 12. The tokenization steps in this embodiment are largely the same as those identified above, with respect to the vaultless tokenization engine of the embodiment described in FIG. 2-FIG. 9. However, the step of a customer making a request for tokenization is preceded by the creation and return of a data owner ID. In particular, the tenant/customer requests the security provider to create a data owner record with data owner preferences. The security provider then creates a data owner record and provides the tenant/customer with a data owner ID. The data owner ID is one attribute of a data owner database. As discussed below, the importance of this step is more apparent when the tenant/customer attempts access the protected data. The data owner's accessibility preference is an attribute with the data owner ID in the data owner database.

Figure 14:
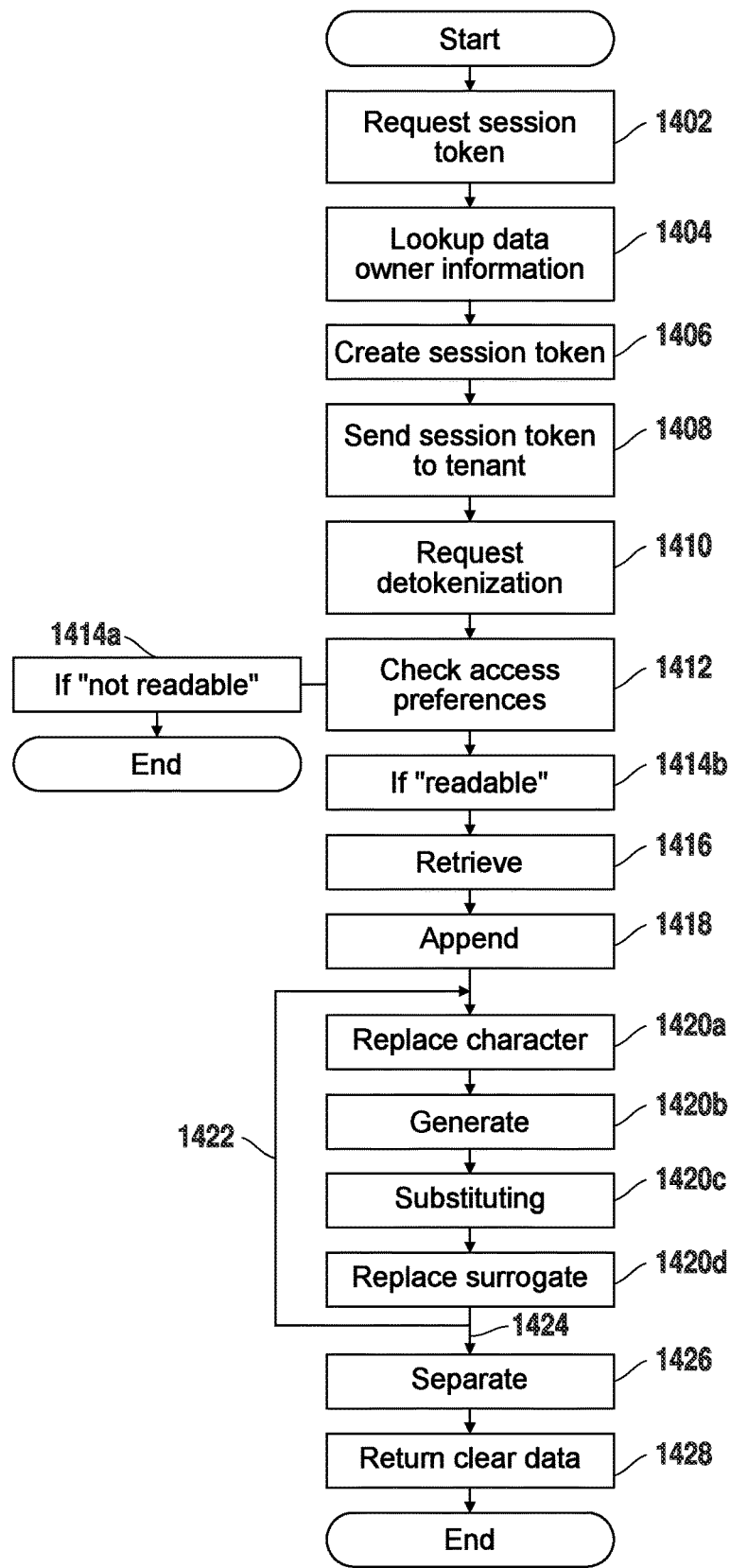
FIG. 14 is a block diagram showing the steps of detokenization in the embodiment illustrated in FIG. 12.

FIG. 14 is a block diagram showing the steps of detokenization in one embodiment of the present invention. The process of detokenization in this embodiment is similar to the process of detokenization (i.e., deconstruction) previously discussed, including several shown in FIG. 12, steps 1078, 1080, 1082, 1084, 1086, 1088*a*. One difference between detokenization as an avenue for carrying out the right to be forgotten in this embodiment (as compared to detokenization sans the right to be forgotten)—is the inclusion of step(s) wherein the access preferences of the data owner are consulted, and detokenization may cease early if the data owner has elected for data to be forgotten, or otherwise limited.

The process of detokenization is frequently triggered by the tenant/customer wishing to review or otherwise access protected data belonging to a data owner. In step 1402, the tenant/customer 1432 requests a session token from the security provider 1434 with specific reference to the data owner ID. The security provider looks up and reviews the data owner record for the data owner in step 1404.

The security provider creates a session token in step 1406. The session token is sent to the tenant/customer in step 1408. In step 1410, the tenant/customer requests detokenization of the protected data from the security provider. In step 1412, the security provider receives the request to detokenize and checks the access preferences of the data owner. In particular, the security provider consults the data owner database for the data owner based on the data owner ID. The security provider looks to the data owner's readable preference as indicated.

If during step 1412, the security provider determines the data owner's readable preference is "not readable" (or the equivalent) 1414*a*, the process of detokenization ceases. The data owner has invoked the right to be forgotten and neither the tenant/customer nor the security provider can read the personal data until the data owner changes her readable preference to "readable." Alternatively, if the security provider determines the data owner's readable preference is "readable" (or the equivalent) 1414*b*, the process of detokenization continues until the data is completely detokenized and returned in clear data to the tenant/customer.

In at least one embodiment, if the process of detokenization continues, in step 1416, the security provider retrieves the final token, session token, and token definition identifier from the data owner at the point of input (e.g. cell phone, tablet, computer). The security provider returns the final token to its form containing the salts previously added inn step 1418. The security provider begins identifying a surrogate value at a particular index. First, the character(s) are replaced with static value(s) defined in the token definition, and then the derived key is generated (the derived key is used to select and order the lookup tables that will be used for the translation) in step 1420*a*. Second, the security provider then proceeds to reverse translate (i.e., replacing one value with a different value) the surrogate value identified in in the previous step using the one or more lookup tables provided for based on the token definition, input value, index, character value and the derived key in step 1420*b*. Third, the process continues by processing the derived key in reverse through the algorithm in step 1420*c*. The resulting value is the input value. Fourth, the process continues by requiring the security provider to replace the character at the index with the original character at that index based on the token definition configurations in step 1420*d*. The prior four steps are repeated 1422 until all substituted characters have been replaced with their original values in the input value.

After all substituted characters have been replaced with their original values in the input value 1424, the security provider separates the previously appended user value, the tenant unique key (i.e., tenant definition key), the token unique key (i.e., token definition key) and the user secret in step 1426.

Finally, the security provider returns the user value (i.e., data owner's data)—which is no longer appended—to the tenant/customer in step 1428. The returned data is presented in clear text format.

Figure 15:
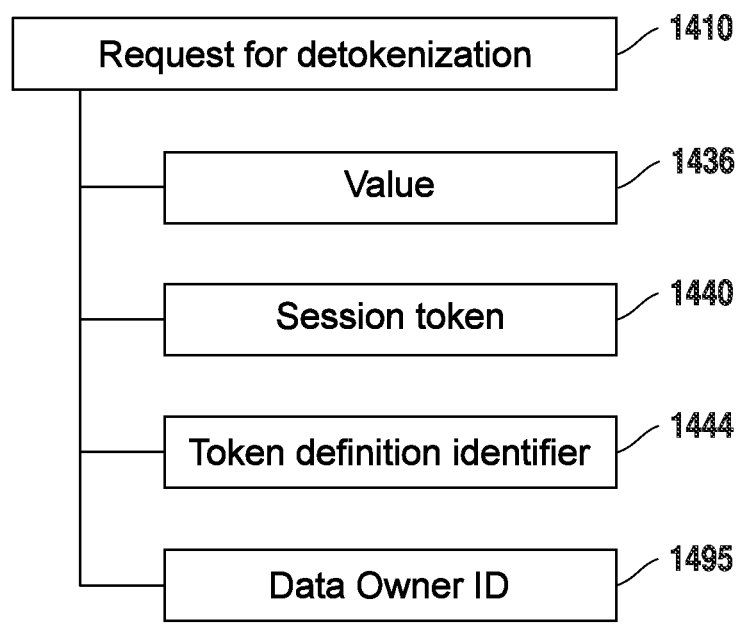
FIG. 15 depicts a request for detokenization.

As shown in FIG. 15 a request for detokenization 1410 comprises a session token 1440, a value 1436, a token definition identifier 1444, and a data owner ID 1495. A user value 1436 is any string of characters provided in a request for tokenization or detokenization 1410 (e.g., "John Doe" where the type of data is a name; "123-45-6789" where the type of sensitive data is a social security number, etc.). A data owner ID 1495 is an identifier created and assigned to the data owner at the beginning of tokenization in this embodiment.

Figure 16A:
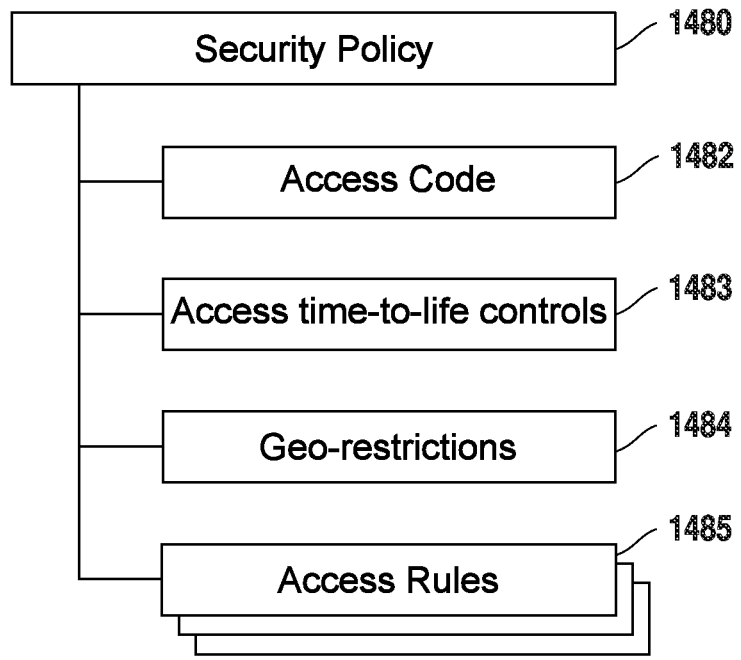
FIG. 16A depicts a security policy object.

As shown in FIG. 16A a security policy object 1480 of this embodiment comprises a unique access code 1482, access time-to-live controls 1483, geo-restrictions 1484, and zero to many access rules 1485. A unique access code 1482 is a unique series of characters required to begin authentication (e.g., password). The authentication process of creating a session token requires a policy and policy password/access code to successfully issue a session token in order to tokenize/detokenize. Once a policy is used to issue a session token, time-to-live controls 1483 (i.e., time-based restrictions or time based controls) provide parameters for how long a session token will live for and/or during what times a session token can be used. Once a security policy is used to issue a session token, geo-restrictions (i.e., geo-fencing) 1484 are parameters that can enforce where a session token can be used from. For example, geo-restrictions can be designated based on city, state or country; IP addresses; or other custom geographic restrictions. Access rules 1485 are also optional. An access rule 1485 is simply a joining of an API operation with a token definition. An access rule defines what operations/actions will be allowed with the session token. When a security policy is used to issue a session token, these access rules define what the session token can do with data (e.g. detokenize, tokenize, encrypt, read masked value, etc.). When present, there can be one or any number of access rules 1485.

Figure 16B:
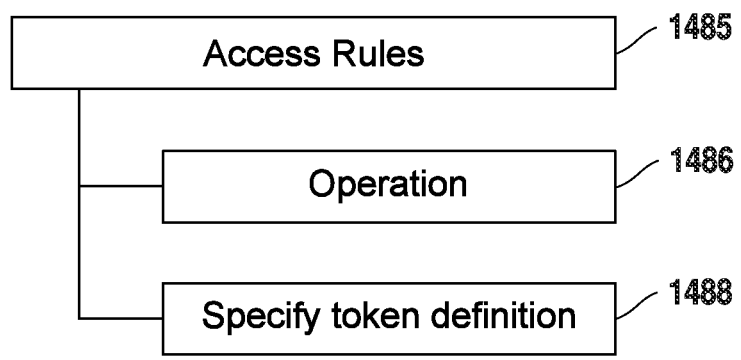
FIG. 16B depicts an access rules object.

As shown in FIG. 16B, an access rule 1485 contains attributes specifying an operation 1486 and an attribute specifying token definition 1488. With respect to access rules 1485, and operation 1486 is an action that can be performed against data. Example operations include Encrypt, Tokenize, Detokenize, Translate, PatternMatch, BatchTokenize, BatchDetokenize, MultiFunction. Other operation types can be implemented. For example, a particular access rule might reference token definition ID"1" be assigned the operation of tokenization. In that example, when the security policy is used, the operation of tokenization will be accessible and can be carried out on the token definition with token ID definition "1."

Figure 17:
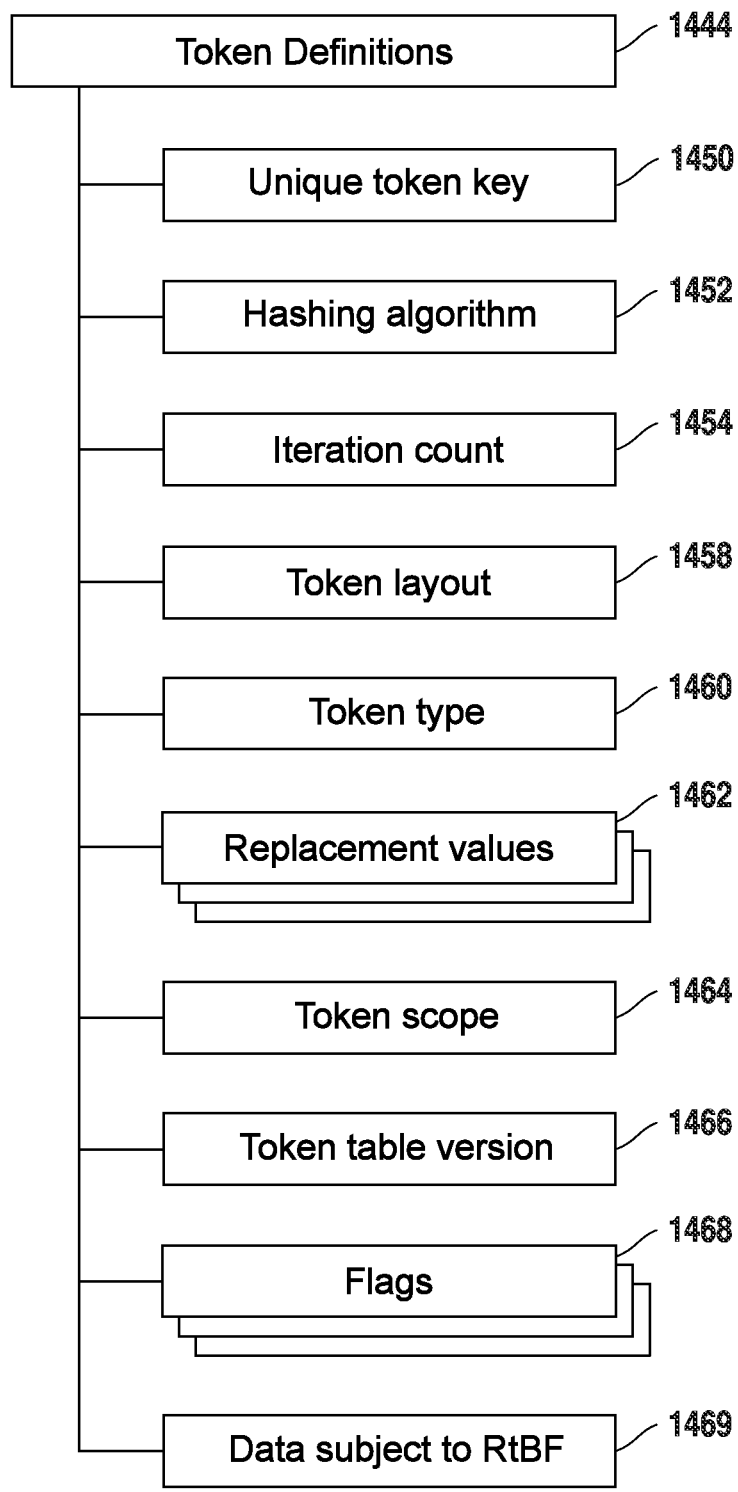
FIG. 17 depicts a token definition object.

As shown in FIG. 17 a token definition 1444 of this embodiment comprises a universally unique key 1450, a hashing algorithm 1452 (i.e., derived key generation mechanism) (e.g., SHA2), an iteration count 1454, a token layout 1458, a token type 1460 (e.g., date, time, string, numeric, etc.), one or more replacement values 1462, a token scope 1464 (e.g., global, session, random; this attribute controls one of the salt values which can make a token engine run differently depending on time), a token table version 1466, one or more flags 1468 controlling how the resulting token should be formatted, and an attribute 1469 indicating data subject to the right to be forgotten.

The attribute 1469 indicating data subject to the right to be forgotten indicates categories of personal information that a data owner may elect to be forgotten. By way of illustration, these categories could include: name, address, telephone number, social security number.

In some embodiments a token definition might comprise one or more attributes for defining specific conditions for restrictions, such as time, frequency, or geolocation.

Figure 18:
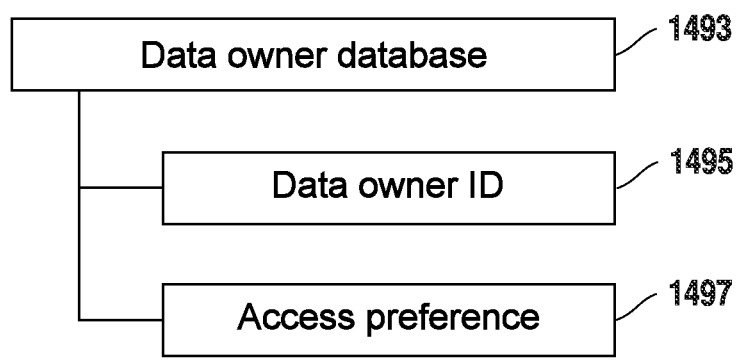
FIG. 18 depicts a data owner database object.

As shown in FIG. 18, the steps of detokenization when used for carrying out the right to be forgotten—in this particular embodiment—includes reviewing a data owner database 1493 for a data owner ID 1495 and data owner readable preference 1497 (i.e., data owner access preference). The data owner database, along with data owner ID and access preferences, are stored by the tenant/customer's. As discussed above, a unique data owner ID 1495 is created during tokenization and specific to a data owner. Subsequently, and at any time that the data owner continues to have an account or otherwise store data with the tenant/customer, the data owner is afforded the opportunity to choose whether she wants her personal information to be readable to the tenant and the security provider. The data owner's decision is reflected in the data owner readable preference 1497. If the data owner wishes for her data to be readable the data owner readable preference 1497 will indicate the data owner's data is readable. If the data owner wishes for her data not to be readable the data owner readable preference 1497 will indicate the data owner's data is not readable.

In various embodiments, the default option might be readable and the data owner must elect for her data not to be readable. Alternatively, the default option might be not readable and the data owner must elect for her data to be readable.

If during detokenization it is determined that the data owner's data is readable 1414b, detokenization will continue. If, however, it is determined that the data owner's data is not readable 1414a, detokenization will not continue. Thus, the data owner is given the ability to invoke the right to be forgotten and the tenant can comply with relevant law(s).

In some alternate embodiments one of the tenant/customer or security provider might not have access to data owner data that is "not readable."

In some embodiments, a request for detokenization comprises a session token, a value, a token definition identifier, a data owner ID, as well as a user secret. A user secret might consist of an answer provided by the user/data owner (and presumably known only by the user) in response to a question (e.g., "what is your favorite book?").

In some alternative embodiments, the data owner might elect for certain categories of data to be "readable" and other categories of data to be "not readable." This election could be carried out in some embodiments by token definitions for data subject to the right to be forgotten. Alternatively, it could be dictated by the tenant/customer or security provider's protocols.

In some alternative embodiments, the data owner might elect for some or all categories of data to be "readable" or "not readable" based on certain criteria. Such criteria might include time; location; requesting party; frequency of request(s).

In other alternative embodiments, different means for running a hash algorithm over the combined derived key and salt value may be used.

In other alternative embodiments, the engine may execute an encryption method rather than a tokenization method when executing the sequence of steps 116a-116d.

In some embodiments tenant/customer has an API key and access to a configuration management portal to make changes to their service configurations such as token definitions, security policies, and more.

Data masking (also known as data scrambling and data anonymization) is the process of replacing sensitive information copied from production databases to test non-production databases with realistic, but scrubbed, data based on masking rules. For reference, a production (i.e., live) database is a database that is used in the daily processing of transactions. By contrast, a non-production database is a database that is used for testing or training purposes.

Data masking is best used in situations when confidential or regulated data needs to be shared with non-production users. These users may include internal users such as application developers, or external business partners such as offshore testing companies, suppliers and customers. These non-production users need to access some of the original data, but do not need to see every column of every table, especially when the information is protected by government regulations.

Data masking enables organizations to generate realistic and fully functional data with similar characteristics as the original data to replace sensitive or confidential information. This contrasts with encryption or Virtual Private Database, which simply hides data, and the original data can be retrieved with the appropriate access or key. With data masking, the original sensitive data cannot be retrieved or accessed.

Live production database environments contain valuable and confidential data. However, each production system usually has replicated development copies, and the controls on such test environments are less stringent. This greatly increases the risks that the data might be used inappropriately. Data masking can modify sensitive database records so that they remain usable, but do not contain confidential or personally identifiable information. Yet, the masked test data resembles the original in appearance to ensure the integrity of the application.

With respect to the present invention, when the data owner makes the decision to remove access to their personally identifiable information by denying anyone the ability to detokenize their data, the data owner changes the data to a completely anonymized data status, (i.e., masked data). Because the data owner alone has the ability to reverse this anonymized data status to the pseudonymized status, (reversible token) and then reverse that action again any time, it changes the definition of the action to "Reversible Masking."

By incorporating the data owner into the process, the process changes from a tokenization/detokenization solution—such as the solution described in U.S. Pat. No. 10,389, 688—to a Reversible Masking Solution.

The present invention is described above in terms of a preferred illustrative embodiment in which a specifically described vaultless tokenization engine and method are described. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

Throughout this application, certain terms are used interchangeably such as "data owner" and "user." The term "service provider," "customer" and "tenant" are also interchangeable.

We claim:

1. A computer-implemented method of restricting access to a data owner's data comprising the steps of:
  receiving a request for tokenization from a user, the request containing a Session token, a token definition logically related to the user, and a received value, wherein the Session token includes a policy identifier logically related to the user and a unique key logically related to the user, and Wherein the token definition comprises one or more of the following attributes:
    a unique key;
    a hashing algorithm;
    an iteration count;
    a token layout;
    a token type;
    one or more replacement values;
    a token scope;
    a token table version;
    a masked character;
    a force luhn check;
    a language;
    a mask layout;
    a maximum token length;
    a minimum token length;
    a preserve case;
    a preserve value type;
    a unique token;
    an attribute for what data is subject to restriction;
    an attribute for whether or not to allow partial restriction;
    an attribute defining specific conditions for restrictions;
    an attribute for whether or not to allow values to be replaced to a same value; and
    one or more flags controlling how the resulting token should be formatted;
  decoding and validating the Session token;
  retrieving the token definition, a token key logically related to the token definition, and a security policy related to the user from a database logically relating the token definition, the token key, and the security policy to the user;
  appending the user key and the token key to the received value to create an input value having more than one input value character;
  replacing each input value character of the input value with a known character to create a replacement input value, where the known character is related within a lookup table to the input value character according to the token definition;
  generating a cryptographically secure hash of the replacement input value to create a derived key;
  substituting each character of the replacement input value with a character from one or more lookup tables to create a third input value, the one or more lookup tables being selected based on one or more of the received value, the position of the character being replaced within the replacement input value, and the derived key;
  returning the third input value to the user as a token;
  receiving a request to modify access to a data owner's data; and
  modifying access to a data owner's data.

2. The computer-implemented method of claim 1 wherein the step of modifying access to a data owner's data comprises disabling a tenant's ability to detokenize the token.

3. The computer-implemented method of claim 2 wherein the step of disabling the tenant's ability to detokenize the token is irreversible.

4. The computer-implemented method of claim 2 wherein the step of disabling the tenant's ability to detokenize the token is reversible.

5. The computer-implemented method of claim 4 further comprising the steps of:
  giving the data owner an option to make the data owner's data visible to a tenant; and
  enabling the tenant's ability to detokenize the token.

6. The computer-implemented method of claim 1 further comprising the step of separating the data owner's data that is personally identifiable information from bulk transactional data.

7. The computer-implemented method of claim 1 further comprising the step of displaying whether a data owner's data is accessible.

8. The computer-implemented method of claim 1 further comprising the step of creating a log that lists one or more data owners along with whether a data owner's data is accessible.

9. The computer-implemented method of claim 1 further comprising the step of creating a log that lists one or more data owners along with when, how and what data was requested and whether the data owner's data was accessed or denied.

\* \* \* \* \*